United States Patent [19]
Bryan

[11] Patent Number: 4,548,853
[45] Date of Patent: Oct. 22, 1985

[54] CLOSURE FOR A SURFACE OPENING HAVING AN OBJECT PASSING THERETHROUGH AND METHOD OF FORMING THE CLOSURE

[76] Inventor: Henry H. Bryan, 3727 El James Dr., Spring, Tex. 77373

[21] Appl. No.: 595,583

[22] Filed: Apr. 2, 1984

[51] Int. Cl.$^4$ .......................... B32B 3/10; E04B 1/94
[52] U.S. Cl. ........................................ 428/131; 52/317
[58] Field of Search ............ 428/131, 134; 174/77 R; 52/317, 220; 464/173

[56] References Cited

U.S. PATENT DOCUMENTS 3,642,531 2/1972 Peterson .......................... 117/218
4,189,619 2/1980 Pedlow ............................. 174/48
4,278,468 7/1981 Selbe et al. ...................... 106/111

Primary Examiner—John E. Kittle
Assistant Examiner—Thomas C. Saitta
Attorney, Agent, or Firm—Jack W. Hayden

[57] ABSTRACT

A penetration seal for a surface opening and method of forming it by positioning a non-liquid, non-combustible substance in the void of the surface opening to provide a dam of desired thickness and applying an elastic coating over the dam and the object adjacent its passage through the dam to accommodate movement of the object relative to the dam without forming cracks in the closure.

12 Claims, 5 Drawing Figures

CLOSURE FOR A SURFACE OPENING HAVING AN OBJECT PASSING THERETHROUGH AND METHOD OF FORMING THE CLOSURE

BACKGROUND OF THE INVENTION

1. Field of the Invention

Where objects such as cables, cable trays, conduits, mechanical piping, ducts and the like pass through openings in walls, ceilings or floors of commercial and industrial buildings, it is desired to seal these openings to aid in confining fire, smoke, toxic or corrosive fumes and water damage. The present invention provides a closure for such surface openings having one or more of the above mentioned objects passing therethrough formed by positioning a non-liquid, non-combustible substance in the void of the opening to block or substantially block the void and applying an elastic coating over the substance and the object adjacent its passage through the substance in the opening to accommodate relative movement between the object and the closure without forming cracks in the closure.

2. Description of the Prior Art

Wall openings receiving objects such as cables, cable trays, conduits, mechanical piping, ducts and the like therethrough are referred to as "penetrations" and seals employed in an effort to seal off the void of the opening around the objects are called penetration seals, penetration sealing systems, fire stops or fire barriers. While the penetration seals are normally tested at various recognized testing laboratories in accordance with recognized procedures well known to those skilled in the art, most penetration seals will never be exposed to an active fire, and primary concerns of users are centered around functional performance and maintenance considerations of the seals - that is, maintaining the seal without cracks which most generally are caused by movement of the object relative to the seal through which it passes due to expansion and contraction.

The prior art with which Applicant is familiar is U.S. Pat. No. 3,022,190 and U.S. Pat. No. 3,642,531. However, neither of these patents deal with penetration seals; U.S. Pat. No. 3,642,531 relates to a cable coating, and U.S. Pat. No. 3,022,190 relates to a process and composition for controlling temperatures.

Penetrating fire stops, that is, seals which stop fire, smoke, toxic or corrosive gases and water damage from passing through openings in the floor and wall into other building areas have been available in several types. A so called mechanical type penetrating fire stop is a mechanical seal that must be built into the wall or floor as the building structure is being erected. Generally speaking, such fire stops will hold a specific number and size of cables, but will not accommodate cable trays, large piping or ducts through the mechanical seal. The rigid engineering and construction requirements, high cost per square foot of the mechanical seals and their lack of versatility make them less desirable for most applications outside of the petrochemical industry. On the other hand, the substantial resistance to explosions of such mechanical stops may make them very desirable, even at higher costs in the petrochemical industry.

Non-mechanical type fire stops or penetration fire stops are generally more versatile in their application to structures where the penetration hole sizes and shapes are designed to accommodate cable trays, piping and the like. They are generally less expensive in overall cost and allow cable trays, pipes and ducts to pass through the penetration opening and seal. The non-mechanical type penetration fire stop can be generally classified in two categories, that is, (1) pour in type of fill materials and (2) surface coating types. The pour in type of fill material fire stop is produced by placing temporary or permanent damming material on both sides of a wall opening or on the bottom side of a floor opening and pouring the liquid sealing or fill material into the cavity (penetration opening) between the damming material in walls or on top of the damming material in floor openings. A penetration fire stop, using this type of prior art construction, may be made, for example, by pouring three inches or more of liquid including foam, gypsum, lightweight concrete, intermecent caulk, or fire resistant mastic into the opening to form the seal.

A surface coating type of fire stop is produced by placing permanent, non-liquid insulation material into or over the floor or wall cavity which forms the penetration opening. The permanent non-liquid insulation material is of a non-combustible type, such as mineral wool, silica fiber, alumina silica fiber, Fiberglas or refractory materials. These insulation materials are almost all of the soft to semirigid type, meaning that they will compress slightly to moderately under pressure. Such material is placed in or over the void forming the penetration opening and positioned to fit tightly around the penetration items, that is, around the cable trays, conduits, mechanical pipes, cables and ducts passing through the penetration opening to form an exposed surface or dam over which a sealing, fire resistant and/or fire retardant coating is applied. When this coating dries, it provides an exposed surface to the completed penetration fire stop that is usually water resistant and in many cases is airtight or nearly airtight.

The coatings used with prior art damming material or substances are formed from material so that they have very little or substantially no elongation.

As a result, when the penetrants going through the penetration opening move in any direction, that is, by way of example, parallel to the wall or floor in which the penetration opening is located, the coating over the damming material breaks loose from the penetrants and may also break loose from the damming material over which it is applied. The break or crack normally occurs at the intersection of the penetrant (object going through the seal), and the exposed face of the seal and is caused because the coating over the damming material, or substance, is not elastic and does not stretch to accommodate such movement of the penetrants, whether they be cable, cable trays or other objects, so that movement of the penetrants due to expansion or contraction or due to other causes generally causes cracks in the seal through which smoke, gases, water or fire may pass from one building area to another.

SUMMARY OF THE INVENTION

The present invention overcomes the above and other problems in that it provides a penetration seal including a damming material or substance and an elastic coating which adheres to the damming substance in the void of the surface opening and which elastic substance also adheres to the objects which penetrate the damming material in the surface opening so that the penetrating objects may move relative to the damming material through which it passes without causing cracks or breaks in the coating material and thus destroying the integrity of the penetration fire stop.

An object of the present invention is to provide a closure and a method of forming the closure for a penetration seal by employing a permanent, non-liquid, non-combustible type of insulation to form a dam or surface in the void of an opening over which an elastomeric coating may be applied as well as to the objects adjacent their passage through the damming material in the opening whereby the objects may move relative to the penetration seal without causing cracks.

Other objects and advantages of the present invention will become apparent from a consideration of the following description and drawings.

DESCRIPTION OF THE PREFERRED EMBODIMENTS

The present invention will be described as it relates to wall openings, but this is by way of example only, and any opening through a floor, ceiling or other structure may be sealed off.

Figure 1:
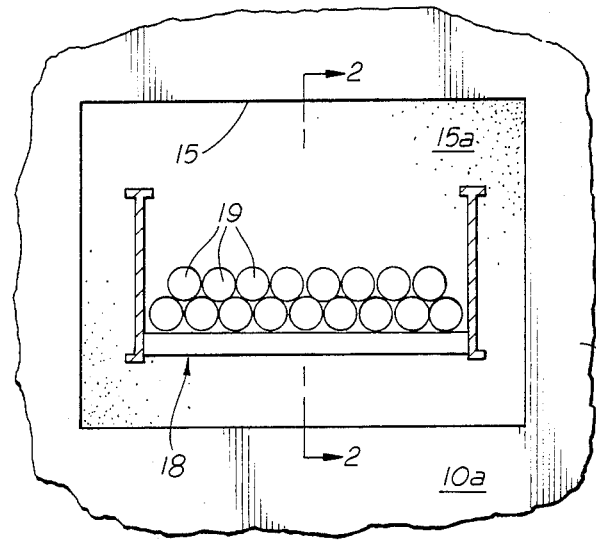
FIG. 1 is an elevational view illustrating an opening in a wall with a ladder type cable tray supporting a plurality of cables passing therethrough.
Figure 2:
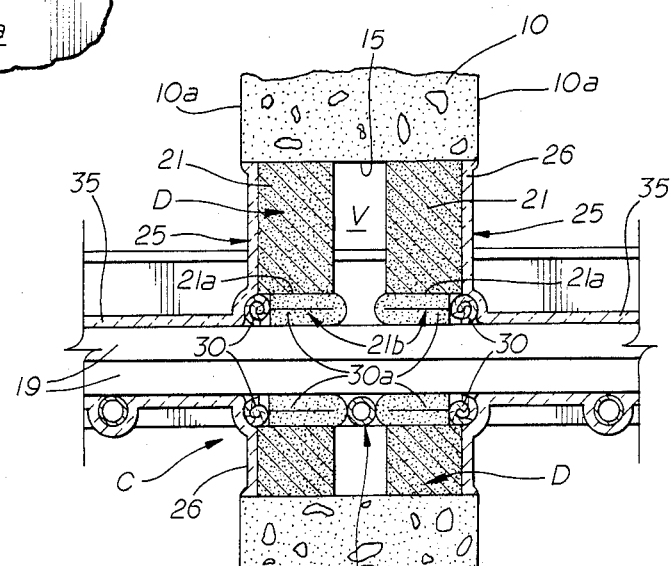
FIG. 2 is a sectional view on the line 2—2 of FIG. 1 illustrating in greater detail the present invention in the opening to form a penetrating fire stop.
Figure 3:
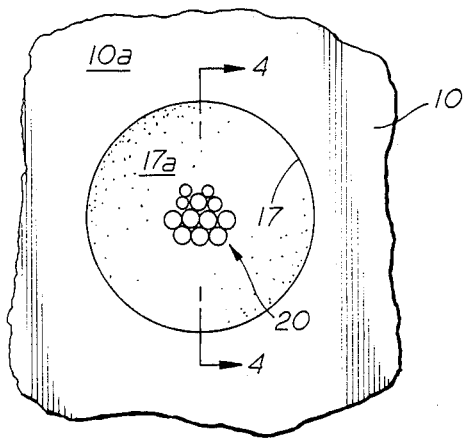
FIG. 3 is an elevational view of a round opening through a surface with a plurality of cables extending therethrough.
Figure 4:
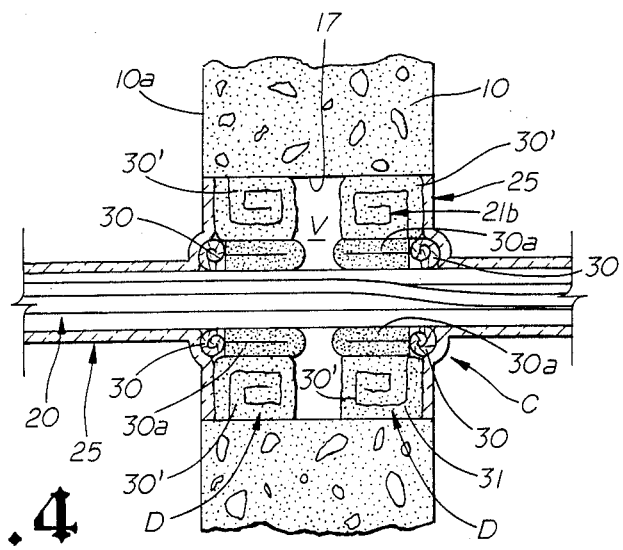
FIG. 4 is a sectional view on the line 4—4 of FIG. 3 to illustrate the present invention in greater detail.

Attention is directed to the drawings wherein 10 represents a wall, floor or ceiling surface of a structure. An opening 15 of rectangular configuration through the wall surface 10 is illustrated in FIGS. 1 and 2 while an opening 17 of circular configuration is illustrated in FIGS. 3 and 4. It can be appreciated that the opening may be of any configuration.

In FIG. 1, a ladder type cable tray is represented schematically at 18 and is shown as supporting a plurality of cables 19 thereon, the cable tray 18 and cables 19, respectively, passing through the opening 15 as better shown in FIG. 2. In FIG. 3, a plurality of grouped cables is referred to at 20 as extending the opening 17 as more clearly illustrated in FIG. 4 of the drawings.

In FIG. 2, the penetration seal of this invention is represented generally by the letter C. The closure or penetration seal includes the damming material D closing or blocking the void 15a of the opening 15 is shown as being formed of a non-liquid, non-combustible substance which substantially completely blocks the void 15a in the opening 15. The non-liquid, non-combustible damming substance D illustrated in the closure of FIG. 2 includes in part panels formed from the group consisting essentially of silica fiber, mineral fiber, alumina silicate fiber, calcium silicate filler, ceramic fiber or refractory material with a binder such as phenolic coating or kaoline clay. The panels 21 are cut and positioned in the opening and are provided with apertures 21a to receive the object or objects therethrough which objects in the FIG. 2 drawing are the cable tray 18 and cables 19 as previously explained.

In order to assure that the void 15a in the opening 15 is completely closed or blocked by the damming material or substance D, one or more of the above substances mentioned, that is, silica fiber, mineral fiber, alumina silicate, calcium silicate fiber, ceramic fiber or refractory material without any binder, is generally represented at 21b and is packed in the opening 21a in the panel 21 which surrounds the cable tray 18 and cables 19 to provide a close fit therewith and form a dam to block the flow of air, gases, fumes, water or fire from one side of the closure or penetration seal to the other side of the closure or penetration seal in the surface 10 of the wall, floor or ceiling. The substance 21b without binder may be rolled or folded as illustrated at 30 and 30a, respectively, in rolls or folds of any suitable size to assure that the cable tray 18 and cables 19 or other objects are sealed off within the void 15a of opening 15.

The closure C also includes an elastic coating 25 applied over the damming material or substance D. The elastic coating is represented at 25 and is applied over the surface 26 of the panels forming the dam D in the void 15a and such coating is also applied over the cable tray 18 and cables 19 adjacent their entry into and exit from the closure as illustrated at 35 in the drawings. Such coating 25 may be applied in any suitable manner, such as by spraying or the like, and it will be noted that the coating is continuous and encapsulates the cable tray 18 and cables 19 adjacent the point of entry and exit from the opening 15 in wall surface 10 much like a rubber glove fits on the fingers of a hand. The elastic coating flexes and accommodates movement of the cable tray 18 and/or the cables 19 relative to the damming material 21 in the opening 15, and thus inhibits, if not completely eliminates, cracks in the penetration seal.

In FIG. 2, it will be noted that the damming material or substance D is provided adjacent the wall surface 10a at each end of the opening 15 in the wall. Also, a void V may be provided between the two structures forming the damming material as shown in the drawings; however, the void V is not critical and the damming material D may completely fill the void 15a formed by opening 15.

FIGS. 3 and 4 illustrate the penetration seal C where the damming substance D around cables 20 is entirely formed of a non-liquid, non-combustible substance 21b without any binder. The substance 21b used as shown in FIGS. 2 and 4 is selected from the group consisting essentially of silica fiber, mineral fiber, alumina silicate fiber, calcium silicate, ceramic fiber or refractory material and is loosely held together so that it may be rolled or folded as illustrated at 30 and 30a in FIG. 2 and previously described to provide suitable size material for filling the void 15a in the opening 15. Similarly in FIG. 4, the substance 21b is in larger rolls 30', smaller rolls 30 and folded as shown at 30a in the void 17a of opening 17 to further seal around the cables 20 and in between the cables 20 to close off any gaps therebetween. This substantially, if not completely, blocks the void 17a. Thereafter, the elastic coating 25 is again applied to the exposed surface of the damming substance D at each end of the opening 17 in a manner as described with regard to the FIGS. 1 and 2 form, that is, the coating 25 extends not only over the damming substance and at least to the edges of opening 17, but it also extends along the cables 20 or other objects for a suitable distance adjacent their entry into and exit from the opening 17.

In the FIG. 4 form, void V may also be provided between the two dams formed adjacent wall surfaces 10a in void 17a, as in FIG. 2, but this again is not critical and the entire void of opening 17 may be filled with the damming material D.

The longitudinal extent of the coating along any object adjacent where the object extends through or exits from the opening is not critical, except that it should be of sufficient extent to inhibit cracking or separation of the coating due to movement caused by expansion or contraction of the object. Ordinarily, applying the coating to the object a distance of approximately six inches to three feet along the object, or objects, from the point of entry into the penetration fire stop and from the point of exit of the object, or objects, from the penetration fire stop of the present invention will be satisfactory regardless of whether the substance forming the dam for the void is fiber without binder, or partly fiber with binder and partly fiber without binder or all fiber with binder.

If desired, a suitable primer may be employed before the coating 25 is sprayed on, but is not essential. In some instances, it may be desired to apply the coating by brush or other applicator.

The group hereinabove referred to as being satisfactory for providing the non-liquid, non-inflammable damming substance or material D can be obtained from any source well known to those skilled in the art. Where the substance is to be a fiber with a binder, one suitable product is Holmes Insulations, #1210 Hilboard. Where it is desired to use a substance which does not have binder, Holmes Insulations, #1280 Flexwhite functions quite satisfactorily. However, there are a number of suppliers of inert, non-liquid, non-combustible substances that can be employed as the material to form the dam in the void of the openings 15, 17 to close, or block, it off.

Further, the substance forming the dam D for the opening in the wall should preferably weigh from 6 to 20 pounds per cubic foot so that it will be more likely to remain in position when placed in the opening, while not being too difficult to handle.

The preferred range of the coating thickness on the exposed surfaces of the substance forming the dam D in the void of an opening and on the object going through the penetration seal of the present invention is approximately 0.010 to 0.200 of an inch, and the ideal range is about 0.030 to about 0.060 inches.

The elastic coating composition of the present invention comprises binder, filler and water as three principle ingredients. Other ingredients may be employed to provide enhancing characteristics, as desired. Any suitable water based resinous emulsion thermo plastic which is elastic may be employed as the binder. For example, acrylic elastomer latex, acrylic modified polyvinyl emulsion, plasticized polyvinyl acetate latex polymers, platicized polyvinyl ethylene latex polymers and plasticized polyvinyl chloride latex polymers. Preferred fillers are alumina trihydrate and $TiO_2$ while others may be employed. The filler reduces the cost of the coating composition and protects the binder from ultraviolet sunlight. The water is present as a vehicle for mixing and for applying the coating.

The range by weight of the binder is preferably about 25% to about 75%; the range by weight of the filler is preferably about 15% to about 60%; and the range by weight of the water is preferably about 7% to about 31%. The mixture is critical in that the coating, to be effective, must elongate at least about 5% longitudinally; however, the percentage by weight of the three essential components hereinabove identified may be varied within the ranges stated so long as the minimum critical elongation of the coating is maintained. When the percentage of the elastomer or binder is less than about 25%, the desired elongation of the coating is not present, and when the percentage of the binder exceeds about 75%, its flammability exceeds an undesirable level. Similarly, when the filler percentage becomes too low so that the percentage of binder exceeds 75%, the flammability again reaches an undesirable level.

Figure 5:
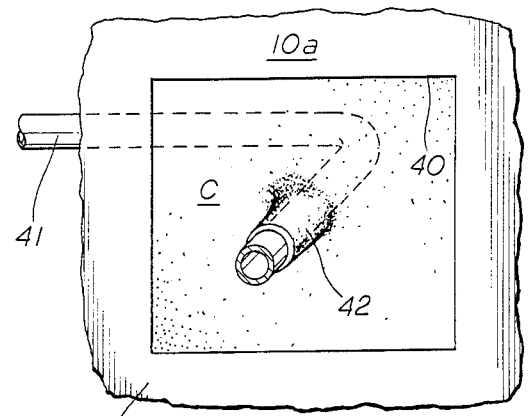
FIG. 5 is a representation illustrating the flexibility of the coating of the present invention.

FIG. 5 illustrates the present invention in use. An opening 40 is provided in wall 10. A cable or conduit is shown at 41 as being parallel to wall 10, and turning at substantially 90° to pass through the penetration seal C formed by the present invention. The member 41 is represented as having been moved to the right as viewed in the drawing due to expansion of the conduit or cable 41. This also urges the portion 42 of pipe or cable 41 extending through the penetration seal of the present invention to the right which compresses or moves the elastic coating 25 on the right of portion 42 adjacent its exit from the penetration seal C and stretches or elongates coating 25 at least adjacent the exit of portion 42 and which is on the left of portion 42 in FIG. 5. This representation of the flexing of coating 25 is represented by the darker dotted portions in FIG. 5. Heretofore, such movement of 41 and 42 caused cracks or voids in prior art penetration seals. However, the elastic coating 25 accommodates such movement without cracking of the coating 25 or any other part of the penetration seal C.

The foregoing disclosure and description of the invention are illustrative and explanatory thereof, and various changes in the size, shape and materials as well as in the details of the illustrated construction may be made without departing from the spirit of the invention.

I claim:

1. A penetration seal for a surface opening having an object passing therethrough comprising a non-liquid, non-combustible substance substantially filling the void in the opening and an elastic coating over the substance and encapsulating the object adjacent its passage through the substance in the opening said elastic coating capable of elongating at least about 5 percent.

2. The penetration seal of claim 1 wherein the substance includes an inorganic or organic binder for holding the substance together.

3. The penetration seal of claim 2 wherein the binder is phenolic coating or Kaolin clay.

4. The penetration seal of claim 1 wherein the weight of the substance is in the range from about 6 to about 20 pounds per cubic foot and wherein the thickness of the coating is in the range of about 0.010 to about 0.200 of an inch.

5. The penetration seal of claim 1 wherein the substance is from the group consisting essentially of silica fiber, mineral fiber, alumina silicate fiber, calcium silicate, ceramic fiber or refractory material.

6. The penetration seal of claim 1 wherein the elastic coating comprises elastic binder, filler and water.

7. The penetration seal of claim 1 wherein the elastic coating comprises a binder which binder consists essentially of a water based, elastic resinous emulsion thermoplastic, a filler and water.

8. The penetration seal of claim 7 wherein the filler is $TiO_2$ or alumina trihydrate.

9. The penetration seal of claims 6, 7 or 8 wherein the elastic coating is any one or more from the group of acrylic elastomer latex, acrylic modified polyvinyl emulsion, plasticized polyvinyl acetate latex polymers, polyvinyl ethylene latex polymers or plasticized polyvinyl latex polymers.

10. The penetration seal of claim 1 wherein the elastic coating comprises any one or more from the group of acrylic elastomer latex, acrylic modified polyvinyl emulsion, plasticized polyvinyl acetate latex polymers, polyvinyl ethylene latex polymers or plasticized polyvinyl latex polymers.

11. The penetration seal of claims 1, or 2, or 3, or 4, or 5, or 6, or 7, or 8 or 10 wherein the range by weight of the binder is about 25% to about 75%; the range by weight of the filler is about 15% to about 60%; and the range by weight of the water is about 7% to about 31%.

12. A method of forming a penetration seal in a surface opening having an object passing therethrough comprising the steps of:

positioning a non-liquid, non-combustible substance in the void of the surface opening to provide a blocking dam of desired thickness; and applying an elastic coating over the dam and encapsulating the object adjacent its passage through the dam to accommodate movement of the object relative to the dam without forming cracks in the penetration seal.

* * * * *